(12) United States Patent
Weber et al.

(10) Patent No.: US 12,091,503 B2
(45) Date of Patent: *Sep. 17, 2024

(54) POLYARYLENE ETHER

(71) Applicant: BASF SE, Ludwigshafen am Rhein (DE)

(72) Inventors: Martin Weber, Ludwigshafen am Rhein (DE); Feely Ruether, Ludwigshafen am Rhein (DE); Rene Backes, Ludwigshafen am Rhein (DE); Christian Maletzko, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 705 days.

This patent is subject to a terminal disclaimer.

(21) Appl. No.: 17/275,590

(22) PCT Filed: Sep. 6, 2019

(86) PCT No.: PCT/EP2019/073785
§ 371 (c)(1),
(2) Date: Mar. 11, 2021

(87) PCT Pub. No.: WO2020/053079
PCT Pub. Date: Mar. 19, 2020

(65) Prior Publication Data
US 2022/0033583 A1 Feb. 3, 2022

(30) Foreign Application Priority Data
Sep. 11, 2018 (EP) .................................... 18193783

(51) Int. Cl.
*C08G 65/42* (2006.01)
*B01D 71/52* (2006.01)
*C08G 65/40* (2006.01)
*C08G 75/23* (2006.01)
*C08G 101/00* (2006.01)

(52) U.S. Cl.
CPC ....... *C08G 65/4012* (2013.01); *B01D 71/522* (2022.08); *C08G 65/42* (2013.01); *C08G 75/23* (2013.01); *C08G 2101/00* (2013.01); *C08G 2150/00* (2013.01); *C08G 2650/40* (2013.01)

(58) Field of Classification Search
USPC .......................................................... 528/125
See application file for complete search history.

(56) References Cited

U.S. PATENT DOCUMENTS

| 7,163,987 | B2 | 1/2007 | Weber et al. |
| 2004/0242807 | A1 | 12/2004 | Weber et al. |
| 2015/0299395 | A1 | 10/2015 | Taylor et al. |
| 2017/0240708 | A1 | 8/2017 | Lim et al. |

FOREIGN PATENT DOCUMENTS

| EP | 1681311 | A1 | * | 11/2007 | ............. C08G 65/40 |
| EP | 3088442 | A1 | * | 11/2016 | |
| JP | 2005-505666 | A | | 2/2005 | |
| JP | 2015-533916 | A | | 11/2015 | |
| JP | 2018-500401 | A | | 1/2018 | |
| WO | WO-2013023997 | A1 | * | 2/2013 | ............. B01D 71/52 |
| WO | 2014/072473 | A2 | | 5/2014 | |

OTHER PUBLICATIONS

EP-1681311-A1 Machine Translation (Year: 2007).*
Abderrazak et al., "Synthesis of New Poly(ether ketone)s Derived from Biobased Diols", Macromolecular Chemistry and Physics, 214, 2013, pp. 1423-1433.
Belgacem et al., "Copolyethersulfones of 1,4:3,6-dianhydrohexitols and bisphenol A", Designed Monomers and Polymers, vol. 19, No. 3, pp. 248-255.
Chatti et al., "Poly(ether sulfone) of Isosorbide, Isomannide and Isoidide", High Performance Polymers, vol. 21, 2009, pp. 105-118.
European Search Report for EP Patent Application No. 18193783.0, Issued on Jan. 30, 2019, 3 pages.
Hibri et al., "Polysulfones", Encyclopedia of Polymer Science and Technology, ed. ed. Herman F. Mark, 3rd edition, vol. 4, Feb. 25, 2003, pp. 1-26.
Kricheldorf et al., "Chapter 7: Aromatic Polyethers", Handbook of Polymer Synthesis, ed. 2nd edition, 2005, pp. 427-501.
Kricheldorf et al., "New polymer syntheses. LXXXII. Syntheses of poly(ether-sulfone)s from silylated aliphatic diols including chiral monomers", Journal of Polymer Science|Part A Polymer Chemistry, vol. 33, Issue 15, Nov. 15, 1995, pp. 2667-2671.
Noshay et al., "Polysulfone-polydimethylsiloxane block copolymers", Journal of Polymer Science Pan A-1: Polymer Chemistry, vol. 9, Issue 11, Nov. 1971, pp. 3147-3159.
Viswanathant et al., "Synthesis, kinetic observations and characteristics of polyarylene ether sulphones prepared via a potassium carbonate DMAC process", Polymer, vol. 25, Issue 12, Dec. 1984, pp. 1827-1836.
International Preliminary Report on Patentability received for PCT Patent Application No. PCT/EP2019/073785, mailed on Sep. 7, 2020, 4 pages.
International Search Report and Written Opinion received for PCT Patent Application No. PCT/EP2019/073785, mailed on Sep. 26, 2019, 8 pages.

* cited by examiner

*Primary Examiner* — Terressa Boykin
(74) *Attorney, Agent, or Firm* — Faegre Drinker Biddle & Reath LLP

(57) ABSTRACT

A polyarylene ether comprising in polymerized form A) at least one tri- or higher functional compound and B) isosorbide. isomannide, isoidide or a mixture thereof, wherein the polyarylene ether is a polyarylene ether sulfone or a polyarylene ether ketone, ¢ process for its preparation and its use in the preparation of a coating, film, fiber, foam, membrane or molded article.

14 Claims, No Drawings

POLYARYLENE ETHER

CROSS-REFERENCE TO RELATED APPLICATIONS

This application is a national stage application (under 35 U.S.C. § 371) of PCT/EP2019/073785, filed Sep. 6, 2019, which claims benefit of European Application No. 18193783.0, filed Sep. 11, 2018, both of which are incorporated herein by reference in their entirety.

The present invention relates to polyarylene ether sulfones or polyarylene ether ketones based on diols which are derived from an anhydro sugar.

Polyarylene ether sulfones and polyarylene ether ketones are classified as high-performance thermoplastics. In several scientific publications the preparation and the properties of polyarylene ether sulfones and polyarylene ether ketones derived from biobased diols are disclosed (Kricheldorf et al. J Polm. Sci. Part A: Polymer Chemistry, Vol 33, 2667-2671 (1995); Chatti et al. High Performance Polymers, 21: 105-118, 2009; Abderrazak et al. Macromol. Chem. Phys. 2013, 214, 1423-1433; Belgacem et al. Designed Monomers and Polymers, 2016, Vol 19, No. 3, 248-255). Polyarylene ether sulfones derived from 1.4:3,6-dianydrohexitols are also disclosed in WO 2014/072473 and US 2017/0240708 A1. Compositions having improved melt stability and comprising up to 20% by weight (wt %) of a polyarylene ether sulfone containing up to 10 wt % of units derived from 1,1,1-tris(4-hydroxyphenyl) ethane are known from U.S. Pat. No. 7,163,987 B2.

The problem addressed by the present disclosure is to present a new polyarylene ether which comprises at least one —SO$_2$— or —CO— group and which is derived from isosorbide, isomannide, isoidide or a mixture thereof. Moreover, said polyarylene ether should support the manufacture of coatings, fibers, films, foams and shaped articles which are high temperature resistant and have good chemical resistance. One motivation was to present a new polyarylene ether which is suitable for the manufacture of membranes. Membranes having a high flux-recovery as well as a high permeability were aimed at, in particular for the use in contact with water, a body fluid or a liquid in food production. Further, a process for the manufacture of said new polyarylene ether in good yield within an industrially acceptable reaction time should be provided.

Hereinunder a polyarylene ether is disclosed which comprises in polymerized form A) at least one tri- or higher functional compound, and B) isosorbide, isomannide, isoidide or a mixture thereof, wherein the polyarylene ether is a polyarylene ether sulfone or a polyarylene ether ketone.

Further, a process is disclosed for the manufacture of a polyarylene ether which comprises reacting a) at least one tri- or higher functional compound, and b) isosorbide, isomannide, isoidide or a mixture thereof with c) at least one difunctional compound comprising a dichlorodiaryl sulfone, a dichlorodiaryl ketone or a mixture thereof. The use of at least one of said, respectively the so obtained, polyarylene ether in the manufacture or for the manufacture of a coating, fiber, film, foam, membrane or molded article as well as a fiber or membrane comprising at least one of said or the so obtained polyarylene ether is disclosed as well. Further at least one article comprising at least one of said membrane is disclosed. In addition, the use of said membrane in contact with water, a body fluid or a liquid in food production is disclosed.

In the following "at least one" in general means one or two or more, such as three or four or five or more, wherein more may mean a plurality or an uncountable. For instance, "at least one" may mean one or a mixture of two or more. If used in connection with chemical compounds "at least one" is meant in the sense that one or two or more chemical compounds differing in their chemical constitution, that is chemical nature, are described.

In the following "polymer" may mean homopolymer or copolymer or a mixture thereof. The person skilled in the art appreciates that any polymer, may it be a homopolymer or a copolymer by nature typically is a mixture of polymeric individuals differing in their constitution such as chain length, degree of branching or nature of end groups. This fact is also often described as distribution. Thus, in the following "at least one" as prefix to a polymer means that different types of polymers may be encompassed whereby each type may have a certain distribution addressed above.

The person skilled in the art further appreciates that any polymer is derived from monomers or oligomers or mixtures thereof which the polymer then comprises in reacted, polymerized form.

In the following compound A is at least one tri- or higher functional compound;

compound B is isosorbide, isomannide, isoidide or a mixture thereof;

diol C1 is at least one compound having two hydroxy groups and which is not compound B;

compound C2 is least one compound comprising at least one dichlorodiaryl sulfone or dichlorodiaryl ketone or a mixture thereof;

starting compounds are compounds A, B, C2 and if present diol C1 prior to being polymerized compound D at least one compound with one functional group reactive towards reactive groups in a polymeric chain solvent L is at least one solvent In principle, a polyarylene ether of any structure is encompassed by the present disclosure provided that the polyarylene ether comprises compound A and compound B and further provided that it is a polyarylene ether sulfone or a polyarylene ether ketone.

The at least one tri- or higher functional compound (compound A) which is comprised in the polyarylene ether is known to or if not known per se can be prepared by methods known to those skilled in art. Compound A can lead to a branched polyarylene ether. Thus, it may be a branching agent. While the polyarylene ether disclosed can be branched it is typically not crosslinked. In case it is crosslinked then mostly to a minor or very minor extend. Compound A may be a monomer or an oligomer. Compound A has three or more functional groups. The number of functional groups as well as their nature and the amount of compound A can influence the branching of the polyarylene ether. It is often preferred that the at least one compound A has 3 to 6, such functional groups. It may be more preferred that compound A has 3 or 4 functional groups if a less branched polyarylene ether is aimed at. If minor branching is desired it can be of particular advantage that the at least one compound A is a trifunctional compound. By way of the functional groups the at least one tri- or higher functional compound can react with polyarylene ether building compounds. Compound C2 or a mixture of compound C2 and diol C1 can be such polyarylene ether building compound. Compound A may also react with compound B.

A typical suitable functional group, such as a hydroxy, nitro or halogen group, is capable of substitution under the condition of polyarylene ether manufacture. Compound A can have functional groups of different nature. This can be advantageous if it is desired to control the branching by way of the differing reactivity of the functional groups. It is also possible that all functional groups of compound A are the same. These may show equal reactivity; but depending on the chemical constitution of compound A said functional groups may still differ in their reactivity during a polymerization reaction. Hydroxy and/or halogen groups may be preferred. Among the halogen groups chlorine is particularly preferred. Compound A which has 3 to 6, specifically 3 or 4 hydroxy and/or halogen—in particular chlorine—groups may by most preferred. It may be very preferable that compound A has three hydroxy groups, thus that it is a triol.

Compound A can be an aromatic compound. An aromatic compound may be preferred if the polyarylene ether is intended for the production of a high temperature resistant and/or sterilizable coating, film, fiber, foam, membrane or molded article.

As compound A of the type of aromatic compounds containing three or more than three hydroxy groups there may be mentioned: phloroglucin, 4,6-dimethyl-2,4,6-tri-(4-hydroxy-5 phenyl)-heptene-2 (trimeric isopropenylphenol), 4,6-dimethyl-2,4,6-(4-hydroxyphenyl)-heptane (hydrogenated trimeric isopropenyl phenol), 1,3,5-tri-(4-hydroxyphenyl)-benzene, 1,1,1-tris-(4-hydroxyphenyl)-ethane, 1,1,1-tris-(4-hydroxyphenyl)-propane, tetra-(4-hydroxyphenyl)-methane, 1,4-bis-(4', 4"-dihydroxytriphenyl)-methyl]-benzene and 2,2-bis-[4,4'-bis-(4-hydroxyphenyl)-cyclohexyl]-propane. Trivalent or more than trivalent phenols which can be prepared by the reaction of p-alkyl-substituted monophenols having unsubstituted o-positions with formaldehyde or formaldehyde-yielding compounds may also be suitable, such as, the trisphenol from p-cresol and formaldehyde—the 2,6-bis-(2'-hydroxy-5'-methylbenzyl)-4-methylphenol. Other examples of suitable aromatic compounds include 2,6-bis-(2'-hydroxy-5'-isopropyl-1-benzyl)-4-isopropenyl 1-phenol and bis-hydroxy-3-(2'-hydroxy-5'-methylbenzyl-5-methylphenyl]-methane.

Examples for compound A of the type of aromatic compounds having chlorine groups are: 1,3,5-tris-(4-chlorophenyl-sulphonyl)-benzene, 2,4,4'-trichlorodiphenyl sulphone, 1-chloro-2,6-bis-(4-chlorophenyl-sulphonyl)-benzene.

1,1,1-trishydroxyphenyl ethane (THPE) may be of particular interest from the aspects of being an aromatic compound, its ease to react under the conditions of polyarylene ether manufacture and industrial availability. THPE can promote the progress of polymerization between compound B and compound C and may for this reason be very advantageous. Moreover, in a poylarylene ether for use in fields in which health safety aspects are of importance such as in contact with water, or liquids in food industry or in the medical field THPE may be advantageously employed.

For the purpose of varying the branching quality a mixture of different tri- or higher functional compounds can be comprised in the polyarylene ether. Thus, for instance 2 to 5, such as 2 to 4 tri- or higher functional compounds can be comprised. It may be preferred that 2 or 3 tri- or higher functional compounds are comprised. From an aspect of complexity of industrial production, it may be more preferred that two tri- or higher functional compounds, in particular only one tri- or higher functional compound are respectively is comprised.

The amount of compound A can vary. If too little thereof is comprised in general the molecular weight of the polyarylene ether remains in a range that is too low for most applications. In addition, the molecular weight build-up may occur not fast enough for efficient industrial production. A too high amount may lead to the formation of a gel like polyarylene ether. This may also not be desired from an aspect of the range of applicability of the polyarylene ether. Therefore, the polyarylene ether generally advantageously comprises from 0.5 to 5 mol % of compound A, such as 0.5 mol %, 1 mol %, 1.5 mol %, 2 mol %, 2.5 mol %, 3 mol %, 3.5 mol %, 4 mol %, 4.5 mol % or 5 mol % of compound A, based on the total amount of compounds A and B and diol C1 comprised in the polyarlyene ether. Thereby, it may be preferred that it comprises from 0.5 to 4 mol % of compound A, based on the total amount of compounds A and B and diol C1 comprised in the polyarlyene ether. It may be most preferred that it comprises from 0.1 to 3 mol % of compound A, based on the total amount of compounds A and B and diol C1 comprised in the polyarlyene ether.

Compound B comprised in the polyarylene ether is isosorbide, isomannide, isoidide or a mixture thereof. Compound B is known to those skilled in the art. Isosorbide, isomannide and isoidide belong to the family of 1.4:3,6-dianhydrohexitols and are of formula I:

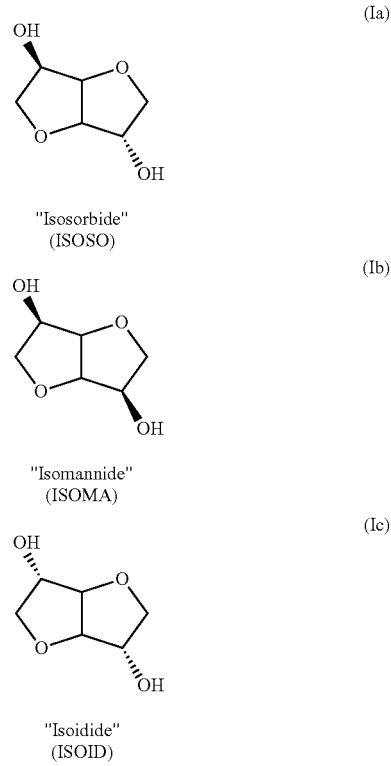

Depending on the desired properties such as glass transition temperature and the modulation thereof the polyarylene ether may comprise as compound B one or a mixture of two or of all three of said dianhydrohexitols. Thus, for instance it may comprise isosorbide and isomannide, isosorbide and isoidide or isomannide and isoiodide. It may be preferred that only isosorbide, isomannide or isoiodide is comprised. Isosorbide may be most preferred for instance for the fact that it is commercially available and the thermal stability which it may impart to the polyarylene ether. Isoidide may have advantages with respect to ease of reaction.

The polyarylene ether may comprise compound B as the sole diol. It is also possible that in addition the polyarylene ether is derived from at least one further compound which is difunctional and has two hydroxy groups, that is a diol which is not compound B (diol C1) and which is comprised in the polyarylene ether in polymerized form. It may be possible that the polyarylene ether is derived from 5 to 100 mol % of compound B, based on the total weight of starting material of compound B and diol C1. It may be more preferred that the polyarylene ether is derived from 25 to 100 mol %, most preferably from 50 to 100 mol % of compound B, based on the total weight of starting material of compound B and diol C1. In particular, if a polyarylene ether is sought for the manufacture of products for contact with water, liquids in food production or the medicinal field, more specifically for the production of hollow fibers or membranes in said fields, it may be advantageous that it comprises compound B as the sole diol.

Diol C1 can be an aliphatic or an aromatic compound. Generally, diol C1 can preferably be an aromatic compound. It may for instance be a dihydroxy arylene sulfone or a dihydroxyarylene ketone. The following compounds are examples for diols C1 which may be preferred:
- a dihydroxybenzene, especially hydroquinone and resorcinol;
- a dihydroxynaphthalene, especially 1,5-dihydroxynaphthalene, 1,6-dihydroxynaphthalene, 1,7-dihydroxynaphthalene, and 2,7-dihydroxynaphthalene;
- a dihydroxybiphenyl, especially 4,4'-biphenol and 2,2'-biphenol;
- a bisphenyl ether, especially bis(4-hydroxyphenyl) ether and bis (2-hydroxyphenyl)ether;
- a bisphenylpropane, especially 2,2-bis(4-hydroxyphenyl) propane, 2,2-bis(3-methyl-4-hydroxyphenyl)propane and 2,2-bis(3,5-dimethyl-4-hydroxy-phenyl)propane;
- a bisphenylmethane, especially bis(4-hydroxyphenyl) methane;
- a bisphenyl sulfone, especially bis(4-hydroxyphenyl) sulfone;
- a bisphenyl sulfide, especially bis(4-hydroxyphenyl) sulfide;
- a bisphenyl ketone, especially bis(4-hydroxyphenyl) ketone;
- a bisphenylhexafluoropropane, especially 2,2-bis(3,5-dimethyl-4-hydroxyphenyl)hexafluoropropane; and
- a bisphenylfluorene, especially 9,9-bis(4-hydroxyphenyl) fluorene.

Diol C1 may preferably be hydroquinone, resorcinol, dihydroxynaphthalene, especially 2,7-dihydroxynaphthalene, 4,4'-biphenol or a mixture thereof.

While as diol C1 a mixture of two or more diols can be comprised in the polyarylene ether it may be preferred that only one is comprised, which may most preferably be hydrochinone or 4,4'-biphenol. Under certain aspects it may be also advantageous that diol C1 is dihydroxydiphenylsulfone.

The polyarylene ether is a polyarylene ether ketone or a polyarylene ether sulfone. Generally, a polyarylene ether ketone comprises —O— and —CO— groups which link arylene groups. A polyarylene ether ketone may comprise only —O— and —CO— groups. It is also possible that it comprises further groups, which link arylene groups. Examples for such further groups which link arylene groups are —S—, —NN— or alkylene groups. Thereby a polyarylene ether ketone which comprises a certain amount of —SO₂— groups or a certain amount of —SO₂— groups and at least one further group is included in the disclosure. In this case less than 50 mol-% of the theoretically possible —CO— groups present in the polyarylene ether ketone are replaced by —SO₂— groups. Generally, not more than about 30 to 40 mol-% of the theoretically possible —CO— groups present in the polyarylene ether ketone are replaced by —SO₂— groups. If present in the polyarylene ether ketone typically 1 mol-% or more, preferably 5 mol-% or more of the theoretically possible —CO— groups present in the polyarylene ether ketone can be replaced by —SO₂— groups. Thus, for instance from 1 to 20 mol-% of the theoretically possible —CO— groups present in the polyarylene ether ketone can be replaced by —SO₂— groups.

Likewise, a polyarylene ether sulfone may comprise only —O— and —SO₂— groups which link arylene groups. It is also possible that it comprises further groups, which link arylene groups. Groups such as –S—, —NN— or alkylene groups can be mentioned as examples thereof. Thereby a polyarylene ether sulfone which comprises a certain amount of —CO— groups or a certain amount of —SO₂— groups and at least one further group is included in the disclosure. In this case less than 50 mol-% of the theoretically possible —SO₂— groups present in the polyarylene ether sulfone are replaced by —CO— groups. Generally, not more than about 30 to 40% of the theoretically possible —SO₂— groups present in the polyarylene ether sulfone are replaced by —CO— groups. If present in the polyarylene ether sulfone typically 1 mol-% or more, preferably 5 mol-% or more of the theoretically possible —SO₂— groups present in the polyarylene ether sulfone may be replaced by —CO— groups. Thus, for instance from 1 to 20 mol-% of the theoretically possible —SO₂— groups present in the polyarylene ether sulfone may be replaced by —CO— groups.

It may be preferred that the polyarylene ether comprises at least one unit of the general formula II (unit U1)

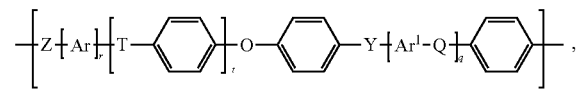

(II)

and at least one unit which is derived from a unit U1 and compound A (unit U2),
where the definitions of the symbols t, q, Q, T, Y, Ar and Ar' are as follows:
r: 0, or 1
t, q: independently of one another 0, or 1, or 2, or 3,
Q, T, Y: independently of one another in each case a chemical bond or group selected from —O—, —S—, —SO₂—, S=O, C=O, —N=N—, and —CR$^a$R$^b$—, where R$^a$ and R$^b$ independently of one another are in each case a hydrogen atom or a C1 to C12-alkyl, C1 to C12-alkoxy, C3 to C12-cycloalkyl, or C6 to C18-aryl group, and where at least one of Q, T, and Y is —SO₂— or —CO—,
Z: a group derived from ISOSO, ISOMA or ISOID, and
Ar and Ar$^1$: independently of one another an arylene group having from 6 to 18 carbon atoms.

If, within the abovementioned preconditions, Q, T or Y is a chemical bond, this then means that the adjacent group on the left-hand side and the adjacent group on the right-hand side are present with direct linkage to one another via a chemical bond.

However, it may be preferable that Q, T, and Y in formula II are selected independently of one another from —O— and —SO$_2$—, with the proviso that at least one of the group consisting of Q, T, and Y is —SO$_2$—.

If Q, T, or Y is —CR$^a$R$^b$—, R$^a$ and R$^b$ independently of one another are in each case a hydrogen atom or a C1 to C12-alkyl, C1 to C12-alkoxy, or C6 to C18-aryl group.

It may be preferred that C1 to C12-alkyl comprises linear and branched, saturated alkyl groups having from 1 to 12 carbon atoms. The following moieties may be mentioned in particular: C1 to C6-alkyl moiety, e.g. methyl, ethyl, n-propyl, isopropyl, n-butyl, sec-butyl, 2- or 3-methylpentyl, and longer chain moieties, e.g. unbranched heptyl, octyl, nonyl, decyl, undecyl, lauryl, and the singly branched or multi-branched analogs thereof.

Alkyl moieties that can be used in the abovementioned C1 to C12-alkoxy groups are for instance the alkyl moieties defined above having from 1 to 12 carbon atoms.

may be hydroquinone, resorcinol, dihydroxy-naphthalene, in particular, it may be 2,7-dihydroxynaphthalene, or 4,4'-biphenol. Ar$^1$ may preferably be an unsubstituted difunctional C6- or C12-arylene group.

It may particularly be preferred that the difunctional C6 to C18-arylene groups Ar and Ar' are phenylene groups, and independently of one another e.g. 1,2-, 1,3-, and 1,4-phenylene, naphthylene groups, e.g. 1,6-, 1,7-, 2,6-, or 2,7-naphthylene, or also the difunctional arylene groups that derive from anthracene, from phenanthrene, or from naphthacene.

It may be preferable that Ar and Ar$^1$ are independently of one another 1,4-phenylene, 1,3-phenylene, naphthylene, in particular 2,7-dihydroxynaphthylene, or 4,4'-biphenylene.

It may be preferred that the polyarylene ether comprises at least one of the following repeat units IIa to IId:

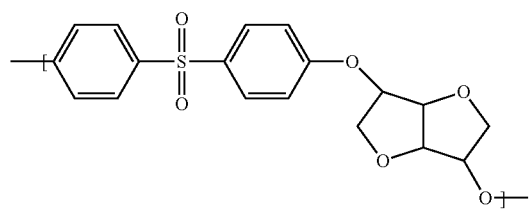

(IIa)

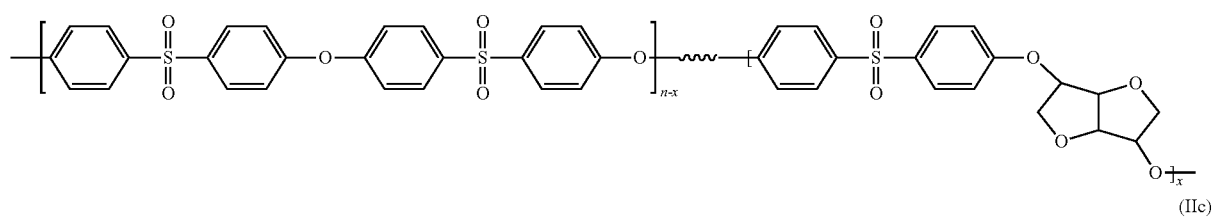

(IIb)

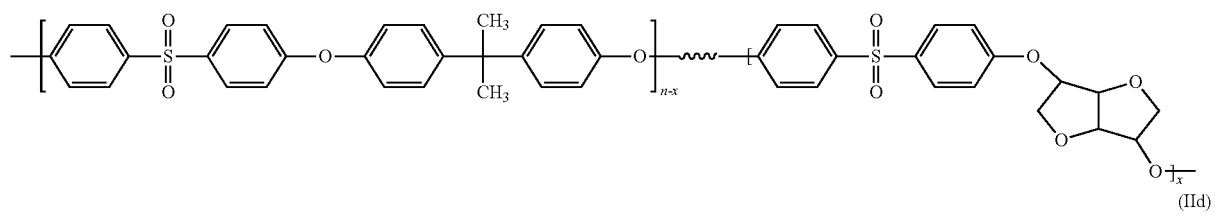

(IIc)

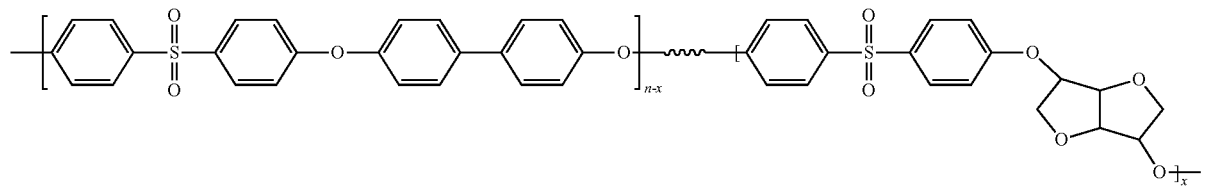

(IId)

C3 to C12-cycloalkyl may in particular comprise C3 to C8 cycloalkyl, e.g. cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and Ar$^1$ are independently of one another a difunctional C6 to C18-arylene group. Proceeding from the starting materials described above or below respectively, Ar may preferably derive from an electron-rich aromatic substance that is very susceptible to electrophilic attack, whereby it wherein x is from 0.05 to 1, n is 1

The polyarylene ether sulfone may particularly preferably have repeat units where Ar is 1,4-phenylene, t is 1, q is 0, T and Y are SO$_2$. This polyarylene ether sulfone may be termed a polyether sulfone (PESU) type polyarylene ether (formula IIa or IIb respectively).

The polyarylene ether sulfone may particularly preferably have repeat units where Ar is 1,4-phenylene, t is 1, q is 0, T is C(CH$_3$)$_2$, and Y is SO$_2$. This polyarylene ether sulfone may be termed a polysulfone (PSU) type polyarylene ether (formula IIc).

The polyarylene ether sulfone may particularly preferably have repeat units where Ar is 1,4-phenylene, t is 1, q is 0, T is a chemical bond, and Y is $SO_2$. This polyarylene ether sulfone may be termed a polyphenylene sulfone (PPSU) type polyarylene ether (formula IId).

For the purpose of the present disclosure, abbreviations such as PPSU, PESU, and PSU are in accordance with DIN EN ISO 1043-1:2001.

The person skilled in the art will appreciate that the at least one unit U2 structurally incorporates unit U1 as described above as well as compound A as described above in any of the possible combinations thereof.

Therefore, the molecular structure of the polyarylene ether can for instance for a PESU type polyarylene ether comprising repeat units IIb be schematically represented as comprising units of formula IIa1 and/or IIa2 and compound A being 1,1,1-trishydroxyphenylethane.

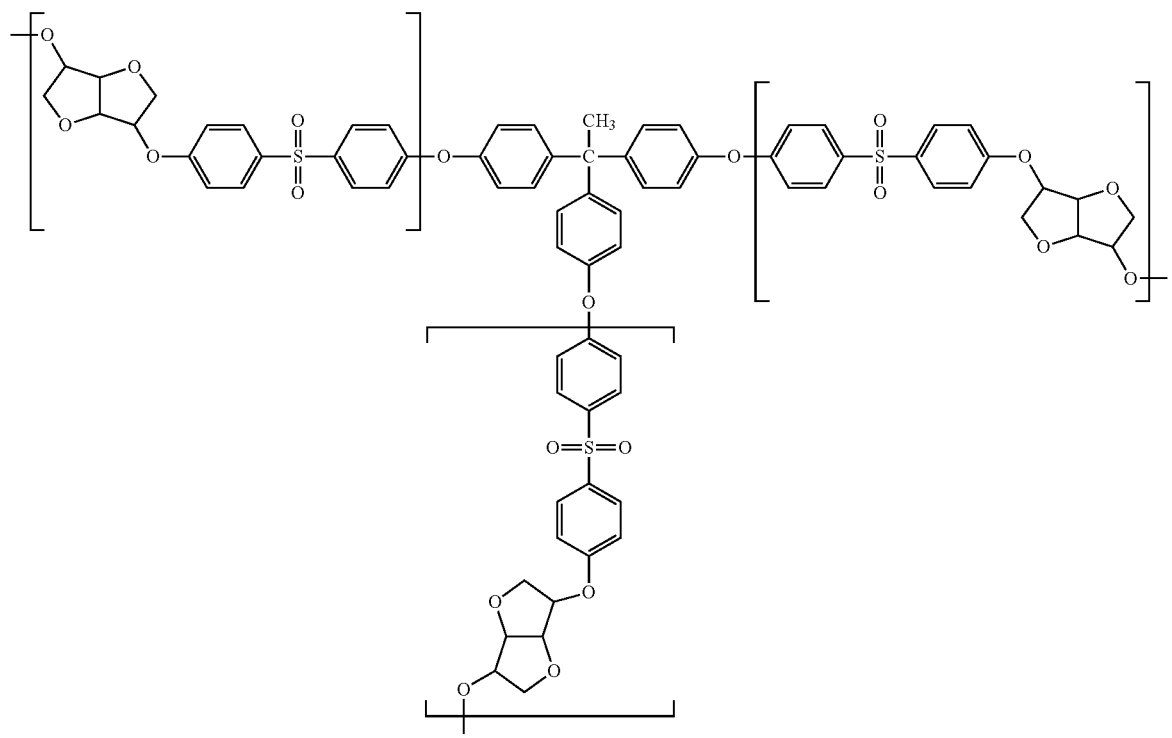

(IIb1)

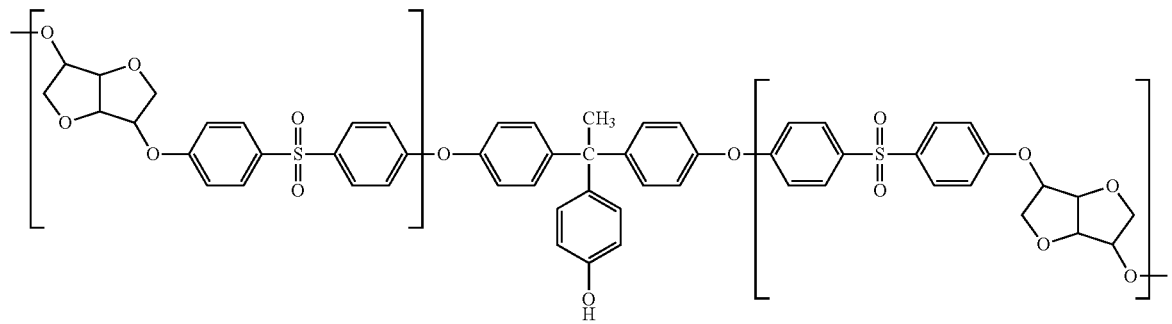

(IIb2)

The person skilled in the art will appreciate that the molar ratios of the at least one unit U1 and the at least one unit U2 will depend on the amounts of compound A within the polyarylene ether as described above.

Optionally the polyarylene ether may further comprise at least one additional repeat unit U3. Said at least one additional repeat unit U3 can preferably be of formula IIIa to IIIo below:

Unit U3 of the general formula III that may particularly preferred are units IIIa, IIIg and/or IIIk.

The polyarylene ether may comprise units U1, U2 and/or U3 in a statistical manner.

The nature of the end groups of the polyarylene ether is not particularly limited. Generally, it may depend on if reactive or non-reactive end groups are desired as end groups. Reactive end groups may for instance be preferred

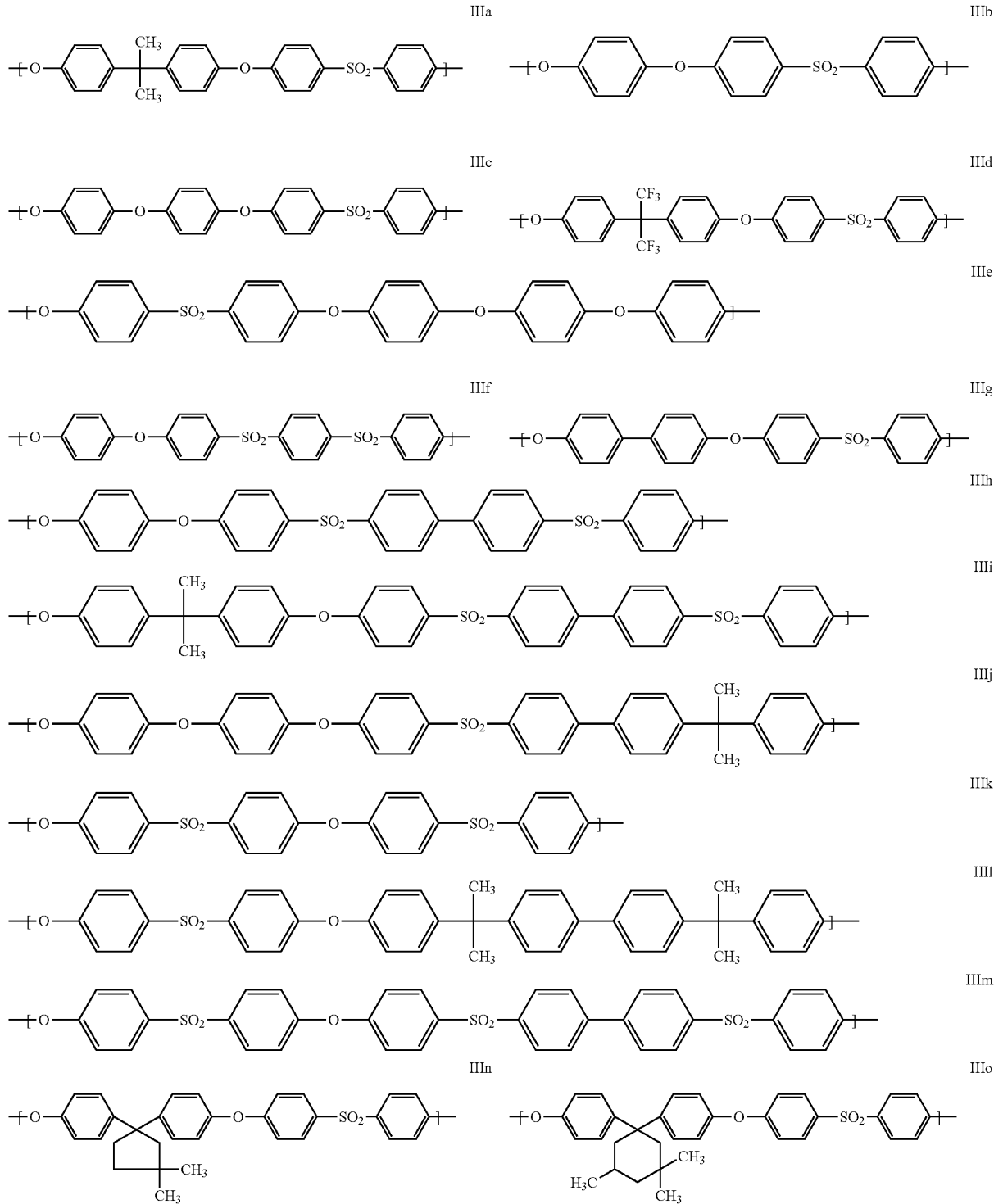

if it is intended to polymerize the polyarlene ether with at least one further monomer or polymer to yield a copolymer such as a block copolymer or a polymer network. Possible end groups are phenolic OH end groups or phenolate end groups, phenolic alkoxy end groups, among which —OCH$_3$ end groups may be preferred, amino end groups, among which —NH$_2$ may be preferred, chlorine end groups. Cl may be most preferred among the end groups. It is also possible that the end groups are phenolic anhydride end groups. The end groups can be of one type or can be different from each other. Generally, it may be preferred that the end groups are Cl—, OH— and/or —OCH$_3$. Often inert end groups are accessible by endcapping reactive endgroups. In the case that the polyarylene ether is intended for an application which is accessible by a method of production through solution, such as solution spinning or casting from solution, endcapping may not be required. Polyarylene ethers which are not endcapped may in particular be useful in conjunction with membrane production. In this case polyarylene ethers which have Cl and/or OH end groups may be advantageous.

The polyarylene ether can preferably have a relative viscosity of 0.20 to 1.30 dl/g, especially of 0.30 to 0.95. According to the solubility of the polyarylene ether, the relative viscosity can be measured in 1% by weight N-methylpyrrolidone solution, in mixtures of phenol and dichlorobenzene, or in 96% sulfuric acid, in each case at 20° C. or 25° C.

The polyarylene ether can preferably have a mean molecular weight Mn (number average) in the range from 2000 to 75 000 g/mol, especially 5000 to 45 000 g/mol, determined by GPC.

The weight-average molar mass Mw of the polyarylene ether may preferably be from 10 000 to 200 000 g/mol, in particular it may be from 15 000 to 150 000 g/mol and it may be particularly preferably be from 18 000 to 100 000 g/mol, determined by means of gel permeation chromatography in dimethylacetamide as solvent against narrowly-distributed polymethyl methacrylate as standard (calibration between 800 to 1820000 g/mol), using 4 columns (pre-column, 3 separation columns based on polyestercopolymers) operated at 80° C. The flow rate was set to 1 ml/min, injection volume was 100 μl. Detection was done using an RI-detector.

The polyarylene ether disclosed can advantageously be prepared by a process which comprises reacting
  a) at least one tri- or higher functional compound (compound A) and
  b) isosorbide, isomannide, isoidide or a mixture thereof (compound B) with
  c) at least one difunctional compound comprising at least one dichlorodiaryl sulfone or dichlorodiaryl ketone or mixture thereof is comprised (compound C2).

Compound A and compound B are described above.

Compound C2 is known or if not known per se it may be prepared by methods known to those skilled in the art. Compound C2 is a difunctional compound. "Difunctional" means that it has two functional groups that are reactive towards compounds A, B and if present diol C1 and which are not fluorine or bromine. Generally compound C2 is not subject to any fundamental restriction, provided that it is sufficiently reactive within a nucleophilic aromatic substitution.

Compound C2 comprises at least one dichlorodiaryl sulfone or dichlorodiarly ketone or a mixture thereof. In addition, compound C2 can for instance comprise at least one compound which is difunctional and allows the preparation of a polyarylene ether sulfone or a polyarylene ether ketone which comprises —S—, S=O, —N=N—, and/or —CR$^a$R$^b$— groups.

For the preparation of a polyarlyene ether ketone compound C2 can be at least one, for instance be one or more dichlorodiaryl ketones, such as 1 to 3 dichlorodiaryl ketones, whereby 1 or 2 dichlorodiaryl ketones, in particular one may be preferred. It is also possible that compound C2 is a mixture of at least 50 mol % of at least one dichlorodiaryl ketone and less than 50 mol % of at least one dichlorodiarylsulfone. For instance, compound C2 can be a mixture of from 50 mol-% such as 60 mol % to 80 or more, such as 90 mol % of at least one dichlorodiaryl ketone and the remainder being at least one, such as 1 to 3, whereby 1 or 2, in particular one may be preferred dichlorodiaryl sulfone.

For the preparation of a polyarylene ether sulfone compound C2 can be at least one, for instance be one or more dichlorodiaryl sulfones, such as 1 to 3 dichlorodiaryl sulfones, whereby 1 or 2 dichlorodiaryl sulfones, in particular one may be preferred. It is also possible that compound C2 is a mixture of at least 50 mol % of at least one dichlorodiaryl sulfone and less than 50 mol % of at least one dichlorodiaryl ketone. For instance, compound C2 can be a mixture of from 50 mol-% such as 60 mol % to 80 or more, such as 90 mol % of at least one dichlorodiaryl sulfone and the remainder being at least one, such as 1 to 3, whereby 1 or 2, in particular one may be preferred dichlorodiaryl ketone.

For the preparation of a polyarylene ether sulfone suitable compound C2 can especially be at least one, whereby one may be preferred dichlorodiphenyl sulfone such as 4,4'-dichlorodiphenyl sulfone, bis(2-chlorophenyl) sulfones, 2,2'-dichlorodiphenyl sulfone, particular preference can be given to 4,4'-dichlorodiphenyl sulfone. If a PESU is sought 4,4'-dichlorodiphenyl sulfone (DCDPS) can be employed. The polyarylene ether sulfone disclosed herein generally shows a lower solution viscosity compared to corresponding linear polymers with comparable molecular weight. For this reason, the polyarylene ether sulfone is generally better processable from solution, in particular for the manufacture of membranes than corresponding linear polymers with comparable molecular weight.

Preference is mostly given to a process which starts from monomeric compounds A, B, C2, and if present diol 01 which means that the reaction may preferably be performed proceeding from monomers and not proceeding from prepolymers.

The starting compounds enter into a polycondensation reaction to give the polyarylene ether copolymer which can typically be carried out in the presence of at least catalytic amounts of a base. It may be carried out in the absence or as it may be preferred the presence of a solvent L. A reaction mixture is formed. The components of the reaction mixture are generally reacted concurrently. The individual components may be mixed in an upstream step and subsequently be reacted. It is also possible to feed the individual components into a reactor in which these are mixed and then reacted. It may be preferred that the reaction is carried out in one stage. This means that the deprotonation of compound B and if present diol C1 as well as A which carries OH groups and also the condensation reaction thereof with compound C2 takes place in one single reaction stage without isolation of the intermediate products.

The preparation of polyarylene ethers with simultaneous control of the end groups is in general known to those skilled in the art and is more specifically described in detail below. For polyarylene ether copolymers it can for instance be achieved by the control of the amounts of functional groups of compounds A, B, C and if present D and/or E which they have prior to being polymerized, that is to say as starting compounds. The ratios of the starting compounds to be used derive in principle from the stoichiometry of the polycondensation reaction which proceeds with theoretical elimination of hydrogen halide, such as hydrogen chloride, and are established by the person skilled in the art in a known manner.

It is generally preferred that the molar ratios of the functional groups of the starting compounds which are reactive towards each other are controlled or adjusted. Thus, the molar ratios of chlorine groups and the functional groups which are reactive towards chlorine—such as in many cases hydroxy groups—can vary, depending on factors such as control of end groups or control of reaction speed and molecular weight. It can be equimolar. In the alternative the molar ratio of the chlorine groups can be higher than that of the functional groups which are reactive towards chlorine—such as in many cases hydroxy groups—or vice versa. Thus, for instance the molecular weight of a polyarylene ether which is a polyarylene ether sulfone comprising phenolate end groups can be adjusted using a defined off-set of the stoichiometric ratio between the starting compounds B and C2. Generally the molar ratios are not more than about 3:1 to about 1:3, such as about 2:1 to about 1:2. With respect to obtaining higher molecular weights the molar ratios are mostly nearer equal molecular ratios.

As disclosed above compound A and diol C1 may have functional groups which are reactive towards chlorine. Compound A may also have chlorine functional groups. Likewise, compound C2 has two chlorine groups or may have one chlorine group and one group reactive towards chlorine. Thus, the ratio of the starting compounds and with them those of the functional groups have to be chosen accordingly.

For instance, to increase the number of phenolic OH end groups, an excess of OH end groups is preferable. It can be preferred that, the ratio of chlorine end groups to phenolic OH end groups is adjusted by controlled establishment of an excess of starting compound with hydroxy functional groups. On a molar basis the ratio of OH groups to chlorine groups may in this case be from 1.005 to 1.2, especially from 1.01 to 1.15, most preferably from 1.02 to 1.1.

In cases in which more stable end groups are sought it may be preferred to increase the number of chlorine end groups, in particular phenyl chlorine, whereby an excess of chlorine end groups is preferable. In a preferred embodiment, the ratio of functional groups to end groups, such as preferred in many cases hydroxy to chlorine end groups is adjusted by controlled establishment of an excess of chlorine containing compounds. Preferably in this case, on a molar basis the ratio of chlorine to OH groups may be from 1.005 to 1.2, especially from 1.01 to 1.15, most preferably from 1.02 to 1.1.

Preferably, the conversion in the polycondensation is at least 0.9, which ensures a sufficiently high molecular weight.

In principle the process can be carried out in the absence of a solvent. In particular in cases in which a very light color of the polyarylene ether is aimed at, the process can mostly more advantageously be carried out in the presence of at least one solvent (solvent L).

Solvent L which may be preferred in the context of the present invention is an organic, especially aprotic polar solvent. Suitable solvent L can also have a boiling point in the range from 80 to 320° C., especially 100 to 280° C., preferably from 150 to 250° C. A suitable aprotic polar solvent is, for example, a high-boiling ether, ester, ketone, asymmetrically chlorineated hydrocarbon, anisole, dimethylformamide, dimethyl sulfoxide, sulfolane, dimethylacetamide (DMAC), N-methyl-2-pyrrolidone (NMP) or N-ethyl-2-pyrrolidone (NEP) or any combination thereof. To enhance solubility solvent L can for instance be a mixture of 2 to 3 solvents. In most cases it can be sufficient to use two or more preferably only one solvent.

Solvent L may especially be DMAC, NMP or NEP or any mixture thereof.

Preferably, the process comprises reacting compounds A, B, C2 and if present diol C1, in at least one aprotic polar solvent mentioned, such as in DMAC, NMP or NEP or any mixture thereof, where especially N-methyl-2-pyrrolidone may be preferred. Thereby it may be preferable to proceed from a mixture of starting compounds A, B, C2 and if present diol C1. To promote the formation of block copolymers it is of course also possible to add certain compound A, B, C2 and if present diol C1 at various times during the reaction. It may in particular be preferred starting from a mixture of one compound A, one compound B, one diol C1 and one compound C2 in at least one aprotic polar solvent, such as in DMAC, NMP or NEP or any mixture thereof, whereby NMP may be especially preferred. An example of a preferred mode of carrying out the process is to react one compound A, one compound B and one compound C2 in at least one aprotic polar solvent, such as in DMAC, NMP or NEP or any mixture thereof, which can especially be in NMP.

To separate the water released during the reaction an azeotrope-forming co-solvent like toluene or chlorobenzene may be used. Typically, it may be preferred not to employ such azeotrope-forming co-solvent. Separation of the water together with the solvent L during the heating process may generally be preferred. Loss of solvent L can be accounted for by for instance starting with a larger amount of solvent L or by adding solvent L during the reaction. The control of the viscosity increase during the reaction can also be a means to control the molecular weight of the polyarylene ether.

The process disclosed may in general comprise that compounds A, B, C2 and if present diol C1 are reacted in the presence of at least one base. The person skilled in the art is aware that functional groups such as OH groups, for instance phenolic OH groups are preferably reacted in the presence of at least one base in order to increase the reactivity toward chlorine substituents of compound C2.

Said at least one base can typically be a hydroxide, carbonate or bicarbonate. Thus, it may be a mixture of at least one hydroxide and at least one carbonate or a mixture of at least one carbonate with at least one bicarbonate. Thereby at least one anhydrous alkali metal carbonate may be preferred. It may also be possible to for instance use a mixture of different hydroxides or different carbonates or different bicarbonates. It may be preferred to use one base. It may be preferred that the one base is one alkali metal carbonate. In particular sodium carbonate, potassium carbonate, calcium carbonate, or a mixture thereof may be preferred, very particularly it may be preferred that potassium carbonate is used as the base. From the aspect of reaction speed and if very light colored polyarylene ethers are aimed at especially potassium carbonate with a volume-weighted mean particle size of less than 100 micrometers, for instance from 5 to 80 μm, preferably from 10 to 60 μm, such as 20 μm, 25 μm, 30 μm, 35 μm, 40 μm, 45 μm, 50 μm or 55 μm or any uneven μm size between 5 to 100 μm, determined at a suspension of the solid in chlorobenzene/sulfolane 60/40 using a Malvern Mastersizer 2000 instrument.

A combination which can be particularly preferred is DMAC, NMP or NEP or any mixture thereof as solvent and potassium carbonate as base, especially potassium carbonate of a size of less than 100 μm. One combination which can be particularly preferred is NMP as solvent and potassium carbonate as base, especially potassium carbonate of a size of less than 100 μm, for instance from 5 to 80 μm, preferably from 10 to 60 μm, such as 20 μm, 25 μm, 30 μm, 35 μm, 40 μm, 45 μm, 50 μm or 55 μm or any uneven μm size between 5 to 100 μm, determined as described above.

The reaction of compounds A, B, C2 and if present C1 can be performed at a temperature at which the reaction proceeds with an acceptable speed and yields a polyarylene ether in an acceptable quality such as having the molecular weight and the molecular weight distribution as desired. Generally, the process can be carried at out at temperatures of from 80 to 250° C., preferably from 100 to 220° C. When the process is carried out in the presence of solvent L and ambient pressure the upper temperature limit is usually determined by the boiling point of solvent L. In particular when the process is carried out in the absence of a solvent the stability of the reactants can be a factor limiting the reaction temperature.

While the person skilled in the art may adapt the reaction temperatures and times to the specific polyarylene ether to be produced, reaction temperatures in the range of from 180 to 205° C. may be applicable and temperatures from 185 to 195° C. may be preferred. At the latter temperatures the reaction may take from 2 to 20 hours, e.g. from 3 to 18 hours, for instance from 5 to 15 hours. In particular if the process is carried out in solvent L, such as NMP said conditions may be the preferred ones.

It may be possible to employ in the process at least one compound with one functional group reactive towards reactive groups comprised in a polymeric chain (compound D). It may be preferred that one compound D is used. Thereby it may be possible to control the chain length of the polyarylene ether copolymer. Generally, a reaction with compound D following the polycondensation reaction for instance after a conversion of at least 0.9 is reached may be preferred. It may be preferred that compound D is at least one aliphatic organic chlorine. The result is further reaction of reactive groups, which can be endgroups, in particular hydroxy end groups. The polyarylene ether copolymer then comprises in reacted form compound D. Such polyarylene ether copolymer is usually stabilized inter alia against further extension of the polymer chain during the course of further processing.

Preferred at least one aliphatic organic halogen compound is at least one alkyl halide, in particular alkyl chloride, having linear or branched alkyl groups having from 1 to 10 carbon atoms, which can in particular be a primary alkyl chloride, particularly preferably methyl halide, in particular methyl chloride.

The reaction with compound D can preferably be carried out at a temperature from 90° to 160° C., in particular from 100° C. to 150° C. The time can vary widely and is usually at least 5 minutes, in particular at least 15 minutes. The reaction time can generally preferably be from 15 minutes to 8 hours, in particular from 30 minutes to 4 hours.

Various methods can be used for the reaction of compound D, more specifically the at least one aliphatic organic chlorine. The amounts used of compound D, more specifically the at least one aliphatic organic chlorine compound, can moreover be stoichiometric or represent an excess, where the excess can by way of example be up to a 5-fold excess. For example, it may be preferred that the at least one aliphatic organic chlorine is added continuously, in particular via continuous introduction in the form of a stream of gas.

Reaction with compound D can be carried out in a separate process unit or as it may be preferred directly in the polycondensation reactor.

If the process is carried out in the presence of solvent L and after the reaction is completed, further solvent L, which can for instance be the solvent L in which the reaction was carried out such as DMAC, NMP, NEP or any mixture thereof, whereby NMP may be preferred, is typically added to cool the reaction mixture down. The reaction mixture can for instance be cooled to the temperature range at which compound D can be reacted with the polyarylene ether in a separate unit or the polycondensation reactor as described above. Thereafter, the reaction mixture may be further cooled if needed, whereby around 80° C. may be preferred. If the polyarylene ether is not reacted with compound D, it may be preferred that the reaction mixture is cooled to around 80° C. At this temperature the reaction mixture, which typically is a dispersion, is taken out of the respective reaction unit, typically comprising a reaction vessel and is transferred into at least one separation unit. Said separation unit may preferably comprise a filtration unit to separate the salt formed during the reaction, e.g. potassium chloride from the reaction mixture. Depending on the viscosity of the dispersion, this process may take minutes or hours such as from 30 min to 24 h. During that time the filtrate may also let to cool down to ambient temperature (23° C.). The product may then be isolated, such as via precipitation due to addition of a non-solvent. This can for instance be a mixture of water and at least one polar aprotic solvent. It may be preferred to use a mixture of water and a solvent L, such as DMAC, NMP, NEP or any mixture thereof, where by NMP may be preferred. Thereby the water can generally be used in portions greater than the solvent L such as DMAC, NMP, NEP or any mixture thereof, whereby NMP may be preferred. Precipitation in a water/NMP-mixture (80/20 by weight) may be most preferred. The precipitation can also be in an acidic medium, such as in a water/NMP-mixture comprising an acid. Suitable acids are for example organic or inorganic acids for example carboxylic acid such as acetic acid, propionic acid, succinic acid or citric acid and mineral acids such as hydrochloric acid, sulfuric acid or phosphoric acid. The obtained powder is collected, typically filtered, and then typically washed and finally dried, whereby temperatures from 80 to 150° C. in the vacuum can be used.

In addition to the disclosure above the person skilled in the art can resort to methods accessible to him by application of his general knowledge. Production processes that lead to a polyarylene ether sulfone are described by way of example in Herman F. Mark, "Encyclopedia of Polymer Science and Technology", third edition, volume 4, 2003, chapter "Polysulfones" pages 2 to 8, and also in Hans R. Kricheldorf, "Aromatic Polyethers" in: Handbook of Polymer Synthesis, second edition, 2005, pages 427 to 443. More details regarding the synthesis of OH-terminated polyarylene ether sulfones are for instance given in R. Viswanathan, B. C. Johnson, J. E. McGrath, Polymer 25 (1984) 1827. Information on the control of the molecular weight are for instance disclosed in A. Noshay, M. Metzner, C. N. Merriam, J. Polym. Sci. A-1 9 (1971) 3147.

The process disclosed herein has the general advantage that the incorporation rate of compound B into the polyarylene ether sulfone is high or very high. Moreover, high molecular weight polyarylene ether sulfones are accessible without having to resort to fluorine containing monomers. Thus, the high molecular weight polyarylene ether sulfone can be produced more environmentally friendly and also less expensive.

Some examples of polyarylene ether sulfones and polyarylene ether ketones which are within this disclosure and which may be prepared according to the process described above and which may be among the preferred are given in Table 1 below

TABLE 1

| Polyarylene ether Number | Polyarylene ether of the type | Compound A Type moles | Compound B ISOSO moles | Compound C | |
|---|---|---|---|---|---|
| | | | | C1 moles | C2 moles |
| P1 | PPSU | THPE 0.01 | Yes 0.95 to 0.1 | BP 0.035 to 0.895 | DCDPS 1.00 to 1.01 |
| P2 | PPSU | THPE 0.02 | Yes 0.80 to 0.90 | BP 0.07 to 0.17 | DCDPS 1.00 to 1.02 |
| P3 | PESU | THPE 0.01 to 0.03 | Yes 0.955 to 0.97 | No | DCDPS 1.00 |
| P4 | PESU | THPE 0.04 | Yes 0.94 to 0.95 | No | DCDPS 1.00 to 1.01 |
| P5 | PSU | THPE 0.01 | Yes 0.95 | Bis A 0.045 | DCDPS 1.00 |
| P6 | PSU | THPE 0.02 | Yes 0.90 | Bis A 0.07 | DCDPS 1.00 |
| P7 | PSU | THPE 0.03 | Yes 0.50 to 0.10 | Bis A 0.455 to 0.8655 | DCDPS 1.00 |

The use of at least one polyarylene ether disclosed herein or obtainable by the process disclosed herein, for instance of the PPSU, the PESU or the PSU type, whereby it may be most preferable that the poylarylene ether comprises THPE, Isosorbide and DCDPS in polymerized form for the production of coatings, fibers, films, foams, moldings and/or membranes is also disclosed herein.

Coating is understood to mean, for example, a layer fixed to the surface of a carrier material, especially adhering thereon. The coating can be applied by a manufacturing process according to DIN 8580. A coating in the context of the present application may be a thin layer or a thick layer, or else one or more intrinsically coherent layers. The carrier materials used may be almost all known materials, such as metals, insulators, semiconductors, crystalline or amorphous materials, textile fabrics (wovens, nonwovens, knits) or films.

A fiber is for example a more or less flexible structure which is thin in relation to the length. A fiber can be compact or hollow. A fiber can be round or almost round or can have a different cross-sectional shape. It can for instance be flat. A fiber can also be tubelike. A fiber may have a smooth surface or it may have pores or holes. A fiber can be obtained for example by an extrusion method. It may be more preferred that a fiber from at least one polyarylene ether, whereby generally one polyarylene ether is preferred, is obtained by a spinning method. Spinning from a solution can be advantageous if thermal stress on the at least one polyarylene ether is a concern. In a number of cases it can be advantageous to employ a solvent for the spinning which comprises or consists of solvent L, for example DMAC, NMP, NEP or any mixture thereof. In case the process is carried out in the presence of solvent L the spinning can for instance be carried out directly after the separation of the polyarylene ether from the salt. It is also possible to isolate the polyarylene ether first and then to dissolve it in the solvent to be used for the spinning. To improve the mechanical properties of a fiber it can be advantageous to spin the at least one polyarylene ether, whereby generally one polyarylene ether is preferred, which can be as it may be preferred—from solution by an electrospinning method, including magnetic electrospinning. Electrospinning may for instance be most preferred in case of the production of a fiber which is a nanofiber. Magnetic electrospinning may be employed for the production of nonwovens from the at least one polyarylene ether, whereby generally one polyarylene ether is preferred. As the electrospinning method requires that the melt or which may be preferred the solution is conductive it may not be necessary to separate the salt, all or essentially all of the salt from the reaction mixture after the reaction. A polyarylene ether which comprises compound B as sole diol may be preferred for the production of a fiber by an electrospinning method.

A membrane is for instance a separating layer. A membrane may be understood to mean an impermeable, partly impermeable or selectively permeable membrane, or a membrane which is pervious in one direction or a pervious membrane. The type of membrane is generally not restricted. Also, the membrane may for instance be a reverse osmosis (RO) membrane, a forward osmosis (FO) membrane, a nanofiltration (NF) membrane, an ultrafiltration (UF) membrane or microfiltration (MF) membrane. In many cases it may be preferred that the membrane is an UF, a NF or a MF membrane.

The polyarylene ether disclosed herein can be used in different filter membrane geometries. For instance, it can be used in a flat membrane and/or in a capillary-like hollow fiber membrane. The flow toward these membranes may take the form of a dead-end flow or of a crossflow.

The membrane may be produced using at least one polyarylene ether, whereby it can be preferred that it is produced from one polyarylene ether. Typically, the membrane can be prepared according to methods known to those skilled in the art. The membrane may for instance be manufactured by casting from a solution. Thereby a casting solution of at least one polyarylene ether in a solvent L, such as DMAC, NMP, NEP or any mixture thereof, whereby NMP may be preferred, can be prepared. Dimethyl lactamide (DML) is another preferred solvent L. Said casting solution typically contains at least one, as is preferred in many cases one, compound which can be removed by washing from the membrane. Said compound is often also termed as pore former. For the purposes of the manufacture of the membrane from at least one polyarylene ether, polyvinylpyrrolidone and/or polyethylene glycol (PEG) can often be used as pore former in a casting solution.

The membrane can be used in contact with water, a body fluid or a liquid in food production. Under certain aspects the membrane can also be employed for the separation of gases.

Thus, the membrane can be used in conjunction with water processing such as separation of solids or medical technology. In the medicinal or industrial fields, the membrane can for instance be used for the recovery of vaccines or antibiotics from fermentation broth, laboratory grade water purification, water disinfection—including removal of viruses, removal of endocrins or pesticides. The membrane can be for instance be used in conjunction with blood treatment such as dialysis. It can for instance be employed for the manufacture of blood treatment devices.

A liquid in food production can for instance be a beverage which may be cleared by a membrane disclosed herein, such as an alcoholic or non-alcoholic beverage such as a fruit juice or beer. Likewise, the membrane may be used in the processing of milk or products derived from milk.

An article comprising at least one membrane can for instance be a filtration system such as a dialysis filter apparatus, a module row or a module rack.

A molded article can essentially be a solid geometric body which can be produced, for example, by molding processes, injection molding, extrusion, calendering, rotomolding, foaming, blow-molding processes, forming processes or joining processes.

EXAMPLES

The examples below provide further explanation of the invention, but do not restrict the same.

Definitions and Abbreviations

Reaction time: time during which the reaction mixture was kept at 190° C.
DCDPS: 4,4'-dichlorodiphenylsulfone
DHDPS 4,4'-dihydroxydiphenylsulfone
BP: 4,4'-dihydroxybiphenyl
ISOSO: isosorbide
THPE 1,1,1-trishydroxyphenylethan
NMP: N-methyl-2-pyrrolidone
PVP: polyvinylpyrrolidone
PEG: polyethylene glycole
PWP pure water permeation
MWCO molecular weight cut off The particle size of the potassium carbonate was determined at a suspension of the solid in chlorobenzene/sulfolane 60/40 using a Malvern Mastersizer 2000 instrument as described above.

Examples C1 to 16: Preparation of Polyarylene Ethers

General Procedure

In a vessel equipped with a stirrer, Dean-Stark-trap, nitrogen-inlet and temperature control the monomers and for the experiments according to the invention also THPE, and potassium carbonate were suspended under nitrogen atmosphere in NMP. Under stirring the mixture was heated up to 190° C. within one hour. The water that was formed in the reaction was continuously removed by distillation. Potential loss of solvent to be accounted for was monitored. Nitrogen is purged through the mixture and the mixture is kept at 190° C. for the condensation time. After this time NMP was added to cool down the mixture to room temperature (within one hour) under nitrogen. To remove the potassium chloride formed the reaction mixture was filtrated. The obtained polymer solution was then precipitated in water, the resulting polymer beads were separated and then extracted with hot water (85° C.) for 20 h. Then the beads were dried at 120° C. for 24 h at reduced pressure (<100 mbar).

Comparative Example C1

The preparation was carried out according to the general procedure with the following specifics:
580.06 g (2.02 mol) of DCDPS, 292.28 g (2.00 mol) of ISOSO, 304.05 g (2.20 mol) of potassium carbonate (volume average particle size of 32.4 μm) were suspended in 1050 ml NMP.
Condensation time: 9 hours
1950 ml NMP were added to cool down the mixture.

Comparative Example C2

The preparation was carried out according to the general procedure with the following specifics:
435,047 g (1.515 mol) of DCDPS, 219.21 g (1.50 mol) of ISOSO and 269.51 g (1.95 mol) of potassium carbonate (volume average particle size of 8.7 μm) were suspended in 790 ml NMP.
Condensation time: 14 hours
1460 ml NMP were added to cool down the mixture.

Experiment 3 According to the Invention

The preparation was carried out according to the general procedure with the following specifics:
435,047 g (1.515 mol) of DCDPS, 212,852 g (1.4565 mol) of ISOSO, 9.19 g (0.03 mol) of THPE, 269.51 g (1.95 mol) of potassium carbonate (volume average particle size of 8.7 μm) were suspended in 790 ml NMP.
Condensation time: 13 hours
1460 ml NMP were added to cool down the mixture.

Example 4 According to the Invention

The preparation was carried out according to the general procedure with the following specifics:
435,047 g (1.515 mol) of DCDPS, 210,441 g (1.44 mol) of ISOSO, 12,254 g (0.04 mol) of THPE and 269.51 g (1.95 mol) of potassium carbonate (volume average particle size of 8.7 μm) were suspended in 790 ml NMP.
Condensation time: 13 hours
1460 ml NMP were added to cool down the mixture.

Comparative Example C5

The preparation was carried out according to the general procedure with the following specifics:
432.91 g (1.5075 mol) of DCDPS, 219.21 g (1.50 mol) of ISOSO, 269.51 g (1.95 mol) of potassium carbonate (volume average particle size of 8.7 μm) were suspended in 790 ml NMP.
Condensation time: 14 hours
1460 ml NMP were added to cool down the mixture.

Comparative Example C6

The preparation was carried out according to the general procedure with the following specifics:
432.91 g (1.5075 mol) of DCDPS, 219.21 g (1.50 mol) of ISOSO, 269.51 g (1.95 mol) of potassium carbonate (volume average particle size of 8.7 μm) were suspended in 650 ml NMP.
Condensation time: 14 hours
1600 ml NMP were added to cool down the mixture to room temperature

Comparative Example C7

The preparation was carried out according to the general procedure with the following specifics:
432.91 g (1.5075 mol) of DCDPS, 153.48 g (1.05 mol) of ISOSO, 112.63 g (0.45 mol) of DHDPS, 269.51 g (1.95 mol) of potassium carbonate (volume average particle size of 8.7 μm) were suspended in 650 ml NMP
Condensation time: 14 hours
1600 ml NMP were added to cool down the mixture.

Comparative Example C8

The preparation was carried out according to the general procedure with the following specifics:
432.91 g (1.5075 mol) of DCDPS, 175.37 g (1.20 mol) of ISOSO, 75.08 g (0.3 mol) of DHDPS, 269.51 g (1.95 mol) of potassium carbonate (volume average particle size of 8.7 μm) were suspended in 650 ml NMP.
Condensation time: 14 hours
1600 ml NMP were added to cool down the mixture.

Example 9

The preparation was carried out according to the general procedure with the following specifics:
432.91 g (1.5075 mol) of DCDPS, 153.48 g (1.05 mol) of ISOSO, 101.36 g (0.405 mol) of DHDPS, 9.19 g (0.03 mol) of THPE, 269.51 g (1.95 mol) of potassium carbonate (volume average particle size of 8.7 μm) were suspended in 650 ml NMP.
Condensation time: 11 hours
1600 ml NMP were added to cool down the mixture.

Example 10

The preparation was carried out according to the general procedure with the following specifics:
432.91 g (1.5075 mol) of DCDPS, 175.37 g (1.20 mol) of ISOSO, 63.82 g (0.255 mol) of DHDPS, 9.19 g (0.03 mol) of THPE, and 269.51 g (1.95 mol) of potassium carbonate (volume average particle size of 8.7 μm) were suspended in 650 ml NMP.
Condensation time of 12 hours
1600 ml NMP were added to cool down the mixture.

Comparative Example C11

The preparation was carried out according to the general procedure with the following specifics:
432.91 g (1.5075 mol) of DCDPS, 218.18 g (1,493 mol) of ISOSO, 1.37 g (0.0045 mol) of THPE and 269.51 g (1.95 mol) of potassium carbonate (volume average particle size of 8.7 μm) were suspended in 650 ml NMP.
Condensation time: 14 hours
1600 ml NMP were added to cool down the mixture.

Comparative Example C12

The preparation was carried out according to the general procedure with the following specifics:
432.91 g (1.5075 mol) of DCDPS, 201.67 g (1.38 mol) of ISOSO, 24.51 g (0.08 mol) of THPE and 269.51 g (1.95 mol) of potassium carbonate (volume average particle size of 8.7 μm) were suspended in 650 ml NMP.
Condensation time: 14 hours
1600 ml NMP were added to cool down the mixture.
The results of these experiments are shown in Table 1.

Comparative Example C13

The preparation was carried out according to the general procedure with the following specifics:
577.16 g (2.01 mol) of DCDPS, 146.14 g (1.00 mol) of ISOSO, 186.21 g (1.00 mol) of BP and 317.88 g (2.30 mol) of potassium carbonate (volume average particle size of 32.7 μm) were suspended in 1050 ml NMP.
Condensation time: 11 hours
1500 ml NMP were added to cool down the mixture.

Comparative Example C14

The preparation was carried out according to the general procedure with the following specifics:
577.16 g (2.01 mol) of DCDPS, 204.59 g (1.40 mol) of ISOSO, 111.73 g (0.60 mol) of BP and 317.88 g (2.30 mol) of potassium carbonate (volume average particle size of 32.7 μm) were suspended in 1050 ml NMP.
Condensation time: 13 hours
1500 ml NMP were added to cool down the mixture.

Example 15 According to the Invention

The preparation was carried out according to the general procedure with the following specifics:
577.16 g (2.01 mol) of DCDPS, 146.14 g (1.00 mol) of Isosorbide, 175.04 g (0.94 mol) of BP, 12.25 g (0.04 mol) of THPE and 317.88 g (2.30 mol) of potassium carbonate (volume average particle size of 32.7 μm) were suspended in 1050 ml NMP.
Condensation time: 6 hours
1500 ml NMP were added to cool down the mixture.

Example 16 According to the Invention

The preparation of was carried out according to the general procedure with the following specifics:
577.16 g (2.01 mol) of DCDPS, 204.59 g (1.40 mol) of ISOSO, 100.55 g (0.54 mol) of BP, 12.25 g (0.04 mol) of THPE and 317.88 g (2.30 mol) of potassium carbonate (volume average particle size of 32.7 μm) were suspended in 1050 ml NMP.
Condensation time: 7.5 hours
1500 ml NMP were added to cool down the mixture.
The results of these experiments are shown in Table 2.
Isolation and Testing of the Polyarylene Ethers The polymers obtained were isolated by dividing the filtrated reaction mixture into droplets and transferring the droplets into a precipitation bath. The precipitation solvent was desalinated water at room temperature. The precipitation height was 0.5 m. The throughput was appr. 2.5 l/h. The so obtained beads were then extracted with water at 85° C.

for 20 h (water throughput 160 l/h). Thereafter the beads were dried under reduced pressure at a temperature below the glass transition temperature (Tg) to a residual moisture of less than 0.5 wt %.

The solution viscosity (V.N.) was determined using a solution of 0.01 g/ml polymer in NMP at 25° C. (DIN EN ISO 1628-1 (October 2012)).

The content of isosorbide and the trishydroxy-phenyl ethane in the polyarylene ether was determined by $^1$H-NMR analysis on a CDCl$_3$ solution.

The Tg of the polymers was determined by DSC-measurement with a heating rate of 10 k/min in the second heating process.

The viscosity of the membrane dope solutions was measured with a Brookfield rheometer at 60° C. at 20 rpm using solutions having the following composition: 19 wt % of the respective poymer, 6 wt % polyvinylpyrrolidone (Luvitec K90, BASF SE) and 75 wt % NMP.

Examples MC1 to M5 Preparation of Membranes

Preparation of the Casting Solution as Well as the Membrane:

Into a three-neck flask equipped with a magnetic stirrer there was added 78 ml of NMP, 5 g of PVP (Luvitec® K40) and 17 g of the polyarylene ether. The mixture was heated under gentle stirring at 60° C. until a homogeneous clear viscous solution was obtained. The solution was degassed overnight at room temperature. After that the membrane solution was reheated at 60° C. for 2 hours and casted onto a glass plate with a casting knife (300 microns) at 60° C. using an Erichsen Coating machine operating at a speed of 5 mm/min. The membrane film was allowed to rest for 30 seconds before immersion in a water bath at 25° C. for 10 minutes.

After the membrane had detached from the glass plate, the membrane was carefully transferred into a water bath for 12 h. Afterwards the membrane was transferred into a bath containing 2500 ppm NaOCl at 50° C. for 4.5 h to remove PVP. After that process the membrane was washed with water at 60° C. and the one time with a 0.5 wt.-% solution of sodium bisulfite to remove active chlorine. After several washing steps with water the membrane was stored wet until characterization started.

In most cases a flat sheet continuous film with micro structural characteristics of UF membranes having dimension of at least 10×15 cm size is obtained. The membrane presents a top thin skin layer (1-3 microns) and a porous layer underneath (thickness: 100-150 microns).

Membrane Characterization:

Using a pressure cell with a diameter of 60 mm, the PWP of the membranes was tested using ultrapure water (salt-free water, filtered by a Millipore UF-system). In a subsequent test, a solution of different PEG-Standards covering the molecular weight (Mw) range from 1000 to 1,000,000 g/mol, concentration of PEG/PEO 0.1 wt. % in water, was filtered at a pressure of 0.15 bar. By GPC-measurement of the feed and the permeate, the molecular weight cut-off was determined. For the GPC-measurements the solutions were used as obtained/prepared. The GPC-measurements were run at 35° C. using two columns with hydroxylated PMMA as stationary phase and a RI-detection system at a flow rate of 0.8 ml/min.

TABLE 1

| Example | C1* | C2* | 3** | 4** | C5* | C6* | C7* | C8* | 9** | 10** | C11** | C12** |
|---|---|---|---|---|---|---|---|---|---|---|---|---|
| V.N. [ml/g] | 14.8 | 34.7 | 55.6 | 63.4 | 32.4 | 35.9 | 54.2 | 45.1 | 64.2 | 62.7 | 36.2 | 39.1 |
| Content Isosorbide [wt %] | 36.8 | 37.6 | 36.6 | 37.7 | 37.5 | 37.3 | 24.8 | 29.0 | 25.8 | 29.9 | 37.3 | 34.5 |
| Isosorbide incorp. Rate [%] | 92.1 | 93.5 | 94.2 | 98.2 | 92.8 | 92.4 | 95.3 | 94.9 | 98.9 | 97.5 | 92.9 | 94.0 |
| Cl/OH-ratio | 1.01 | 1.01 | 1.009 | 1.01 | 1.005 | 1.005 | 1.005 | 1.005 | 1.005 | 1.005 | 1.005 | 1.005 |
| Time$^{a)}$ [h] | 9 | 14 | 13 | 13 | 14 | 14 | 14 | 14 | 11 | 12 | 14 | 14 |
| Tg [° C.] | — | 244 | 248 | 249 | 243 | 245 | 236 | 239 | 240 | 243 | 241 | 242 |
| Yield | <85 | 85.4 | 88.9 | 91.5 | 85.1 | 86.0 | 87.1 | 87.2 | 92.7 | 92.5 | 86.4 | 91.0 |
| η [Pa*s] | 4.3 | 19.0 | 20.8 | 21.7 | 17.5 | 18.6 | 28.2 | 24.1 | 22.0 | 22.6 | 15.4 | 14.6 |

*Comparative examples
**Branched polyarylene ethers comprising ISOSO groups
$^{a)}$Condensation Time

TABLE 2

| Example | C13* | C14* | 15** | 16** |
|---|---|---|---|---|
| V.N. [ml/g] | 65.0 | 47.7 | 75.1 | 73.9 |
| Content Isosorbide [wt %] | 18.2 | 25.7 | 18.6 | 26.5 |
| Isosorbide incorp. Rate [%] | 95.0 | 94.2 | 97.5 | 97.0 |
| Cl/OH-ratio | 1.005 | 1.005 | 1.005 | 1.005 |
| Time$^{a)}$ [h] | 11 | 13 | 6 | 7.5 |
| Tg [° C.] | 233 | 240 | 234 | 241 |
| Yield | 91.2 | 90.2 | 95.2 | 94.1 |
| η [Pa * s] | — | — | — | — |

*Comparative examples
**Branched polyarylene ethers comprising ISOSO groups
$^{b)}$ Condensation Time The polyarylene ethers according to the invention show a higher viscosity number compared to the linear polymers. In addition, the yield was improved. Also, the rate of incorporation of the ISOSO was high. In particular, the incorporation rate was higher in shorter condensation times. In addition, higher yields were obtained in shorter condensation times.

TABLE 3

|   | MC1* | MC2* | M3 | M4 | M5 |
|---|---|---|---|---|---|
| C1 | 17 | | | | |
| C2 | | 17 | | | |
| 3 | | | 17 | | |
| 4 | | | | 17 | |
| PESU | | | | | 17 |
| PVP | 5 | 5 | 5 | 5 | 5 |
| NMP | 78 | 78 | 78 | 78 | 78 |
| PWP [l/m² * h * bar] | No membrane | Membrane brittle | 720 | 760 | 540 |
| MWCO [kD] | | | 63 | 61 | 56 |
| PWP 2 [l/m² * h * bar] | | | 540 | 530 | 290 |

*Comparative Examples
Membranes prepared from the branched polyarylene ether comprising ISOSO showed a high permeability.

After filtration of the PEO-solution for the determination of the MWCO, the membrane was flushed twice with 500 ml portions of ultrapure water. Thereafter the PWP was measured again (PWP 2). The membranes prepared from the polyarylene ethers disclosed herein showed a higher flux-recovery.

The invention claimed is:

1. A polyarylene ether comprising in polymerized form
A) at least one tri- or higher functional compound and
B) isosorbide, isomannide, isoidide or a mixture thereof, wherein the polyarylene ether is a polyarylene ether sulfone or a polyarylene ether ketone.

2. The polyarylene ether according to claim 1, comprising A) at least one trifunctional compound.

3. The polyarylene ether according to claim 1, comprising A) at least one triol.

4. The polyarylene ether according to claim 1, comprising A) 1,1,1-trishydroxyphenyl ethane.

5. The polyarylene ether according to claim 1, comprising B) isosorbide.

6. The polyarylene ether according to claim 1, comprising diol
C1) least one compound having two hydroxy groups and which is not compound B.

7. The polyarylene ether according to claim 1, comprising A) 0.5 to 5 mol %, based on the total amount of compounds A and B and diol C1 comprised in the polyarylene ether at least one tri- or higher functional compound.

8. The polyarylene ether according to claim 1, comprising at least one unit of the general formula II

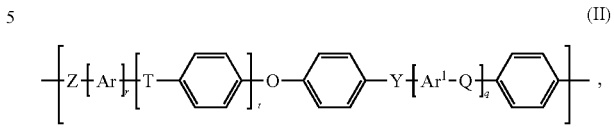

where the definitions of the symbols t, q, Q, T, Y, Ar and $Ar^1$ are as follows:
t, q: independently of one another 0, 1, 2, or 3,
Q, T, Y: independently of one another in each case a chemical bond or group selected from —O—, —S—, —$SO_2$—, S=O, C=O, —N=N—, and —$CR^aR^b$—, where $R^a$ and $R^b$ independently of one another are in each case a hydrogen atom or a $C_1$-$C_{12}$-alkyl, $C_1$-$C_{12}$-alkoxy, or $C_6$-$C_{18}$-aryl group, and
where at least one of Q, T, and Y is —$SO_2$— or —CO—,
Z: a group derived from isosorbide, isomannide, isoidide, and
Ar and $Ar^1$: independently of one another an arylene group having from 6 to 18 carbon atoms.

9. A process for the preparation of a polyarylene ether comprising reacting
a) at least one tri- or higher functional compound and
b) isosorbide, isomannide, isoidide or a mixture thereof with
c) a difunctional compound comprising at least one dichlorodiaryl sulfone, a dichlorodiarylketone or a mixture thereof.

10. The process according to claim 9 comprising reacting the monomers in the presence of a polar aprotic solvent in the absence of an azeotrope forming compound.

11. A fiber comprising a polyarylene ether according to claim 1.

12. A membrane comprising the polyarylene ether according to claim 1.

13. An article comprising the membrane according to claim 12.

14. The article according to claim 13 in contact with water, a body fluid or a liquid in food production.

* * * * *